N. GERL-HOLMEN.
PROCESS OF FLAKING FRIABLE GROATS.
APPLICATION FILED SEPT. 17, 1913.

1,212,205.

Patented Jan. 16, 1917.

Witnesses:
Fred White
René Buine

Inventor:
Niels Gerl-Holmen,
By Attorneys,

UNITED STATES PATENT OFFICE.

NIELS GERL-HOLMEN, OF FREDERIKSBERG, NEAR COPENHAGEN, DENMARK, ASSIGNOR TO KLØVER-BYGGRYN-FABRIKKEN DANMARK, LTD., OF COPENHAGEN, DENMARK.

PROCESS OF FLAKING FRIABLE GROATS.

1,212,205.   Specification of Letters Patent.   Patented Jan. 16, 1917.

Application filed September 17, 1913. Serial No. 790,172.

*To all whom it may concern:*

Be it known that I, NIELS GERL-HOLMEN, agent, subject of the King of Denmark, residing at Gl. Kongevej 149, Frederiksberg, near Copenhagen, Denmark, have invented new and useful Improvements in Processes of Flaking Friable Groats, of which the following is a specification.

Several kinds of cereals, for instance oats, containing a considerable quantity of fat, may easily be flattened so as to form coherent flakes, whereas other cereals, for instance barley, wheat and rice are more friable and ordinarily do not lend themselves to such flaking process without a very considerable portion of the material being transformed into flour. It has been attempted to remedy this by steaming the groats before flaking them, they becoming thereby so plastic that they will stand the treatment in the rolling mill; an additional advantage of the steaming is that it kills all microörganisms. The various processes designed for this purpose have had in view, heretofore, only the treatment of whole grains and they suffer from the drawback that the steaming causes chemical changes, the starch for instance being partly converted into paste whereby the product is deteriorated considerably, mainly in respect to appearance.

The present invention relates to a process whereby this drawback is avoided, and it consists in the carefully hulled grains being coarsely ground whereafter the flour and the finest grits are removed by sifting. The remaining product is moistened and slightly heated by being subjected to steaming for a short time, preferably only for a few seconds, and in no instance in such manner that any chemical change is occasioned. The steam treatment is continued for a period of time of such short duration that the integrity of the starch cells is maintained and the groats retain their original chemical condition. The material under treatment is then rolled, in the known manner, and dried. This product is unaltered except in respect to its shape.

The process is especially suitable for barley but may also be used, with advantage, in case of wheat and rice.

Figure 1:
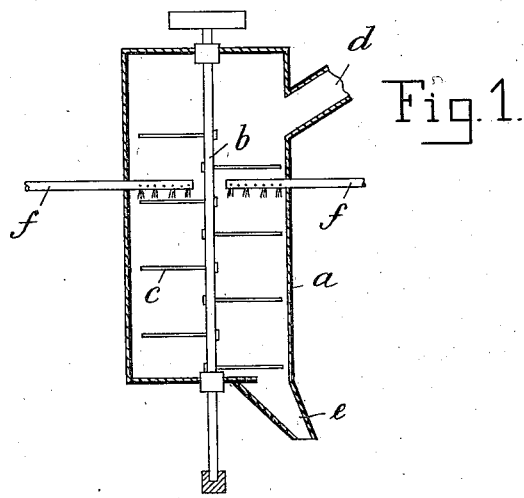
Figure 2:
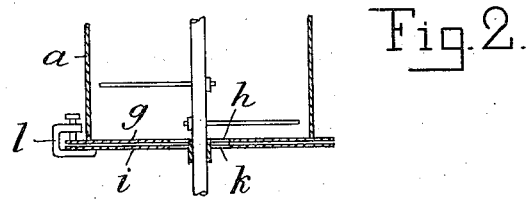
Figure 3:
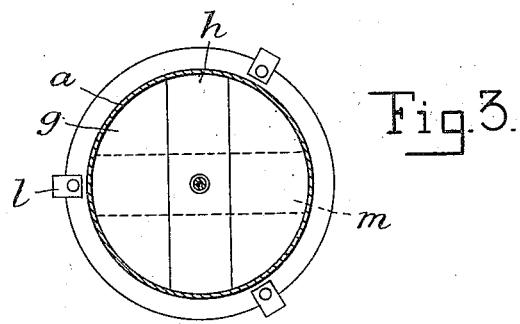

The steam is presented to the material under treatment by means of special apparatus, one example of which being shown in the accompanying drawing, Figure 1 showing the apparatus in vertical section, Figs. 2 and 3 a manner of execution of the discharge opening, in vertical and horizontal section respectively.

In a vertical drum *a*, closed at both ends, a vertical shaft *b* revolves, there being fastened thereto a number of bars *c*, reaching nearly to the circumference of the drum. At top there is a feeding funnel *d* for the raw groats, and at bottom a discharge spout *e* for the steamed groats, and closely below the inlet funnel *d* there is provided a steam pipe *f* by which steam may be admitted into the interior of the drum. The steam-pipes are closed at the end, but each of them has one or more rows of holes, directing downward in a slanting direction. By this arrangement the steam is distributed evenly over the material, and the downwardly directed jets of steam have the effect that the material will not be lifted upward by the steam, nor will it clog together but it will sink downward steadily and gradually, as fast as the finished material escapes at the bottom.

The discharge opening *e* is made adjustable as far as the size of the outlet area is concerned, it being thereby possible to adjust the time of treatment.

The discharge opening may suitably be arranged in the following manner (Figs. 2 and 3): In the vessel *a*'s bottom *g*, projecting somewhat beyond the sides of the vessel, there is provided a transverse slot *h*, and below the bottom there is a plate *i* with a similar slot *k*, the said plate being maintained in contact with the bottom by means of screw-clamps *l*. The plate *i* may be rotated around the axis of the drum, and when the slot *k* is in the position marked *m*, the outlet is nearly closed. In other positions, discharge openings appear, allowing a uniform descent of the material, so that no part of the latter remains too long in the vessel *a*.

The steam-pipes *f* may be fitted with valves whereby the amount of steam may be varied.

By means of this apparatus, it becomes practicable to give the coarsely ground groats the required plasticity in so short a time that no chemical changes shall take place. The groats treated in this manner get a beautiful white appearance, the particles of starch being pressed out to the surface, so that the process renders superfluous the injurious bleaching processes frequently used for this purpose, for instance fumigation with sulfur.

Having now particularly described and ascertained the nature of my said invention, and in what manner the same is to be performed, I declare that what I claim is:—

1. The process for flaking friable groats which consists in coarsely grinding the grain and freeing the same from the finer particles, then subjecting the material under treatment to the action of steam to moisten and slightly heat the same, the steam treatment being continued for a period of time of such short duration that the groats retain their original chemical condition, and then rolling and drying the said material.

2. The process for flaking friable groats which consists in coarsely grinding the grain, then subjecting the material under treatment to the action of steam for a brief period of time of such duration that the groats retain their original chemical condition, and the integrity of the starch cells is maintained, and then rolling the said material.

In witness whereof, I have hereunto signed my name in the presence of two subscribing witnesses.

NIELS GERL-HOLMEN.

Witnesses:
C. Fox Maule,
J. Lehmann.